United States Patent [19]

Holmberg et al.

[11] 4,333,749

[45] Jun. 8, 1982

[54] DRIFT ELIMINATOR STRUCTURE FOR COUNTERFLOW WATER COOLING TOWER

[75] Inventors: Joyce D. Holmberg, Overland Park; Ohler L. Kinney, Jr., Leawood, both of Kans.

[73] Assignee: The Marley Company, Mission, Kans.

[21] Appl. No.: 200,461

[22] Filed: Oct. 24, 1980

[51] Int. Cl.³ .................. B01D 45/16; B01D 51/10
[52] U.S. Cl. .................. 55/257 PV; 55/440; 261/DIG. 11
[58] Field of Search .......... 55/440.1, 257 R, 257 PV; 261/112, DIG. 11

[56] References Cited

U.S. PATENT DOCUMENTS

| | | | |
|---|---|---|---|
| 3,374,994 | 3/1968 | Greer | 261/112 |
| 3,500,615 | 3/1970 | Meek | 55/257 R X |
| 4,040,824 | 8/1977 | Kinney, Jr. | 55/257 R |
| 4,240,814 | 12/1980 | Regehr et al. | 55/440 X |

Primary Examiner—Kathleen J. Prunner
Attorney, Agent, or Firm—Schmidt, Johnson, Hovey & Williams

[57] ABSTRACT

An improved, three-path continuous cellular drift eliminator and method for counterflow cooling towers is provided which gives enhanced water removal without undue pressure drops, and a desirable water particle size distribution in the air leaving the tower, so that excessive water coating on adjacent equipment and structures is avoided. The eliminator preferably includes a plurality of generally upright, discrete, gap-free continuous cells which present three air diversion sections along the length thereof in order to divert fill-derived air along a serpentine path for drift elimination purposes. The third and final section of the eliminator serves to direct the exiting air generally vertically for proper discharge thereof to the atmosphere. The eliminator is preferably fabricated using spaced apart members having planar panels, with corrugated elements therebetween, so as to cooperatively define elongated, continuous eliminator cells. Test results demonstrate that the eliminator hereof gives significantly improved results as compared with a prior cellular-type eliminator.

7 Claims, 7 Drawing Figures

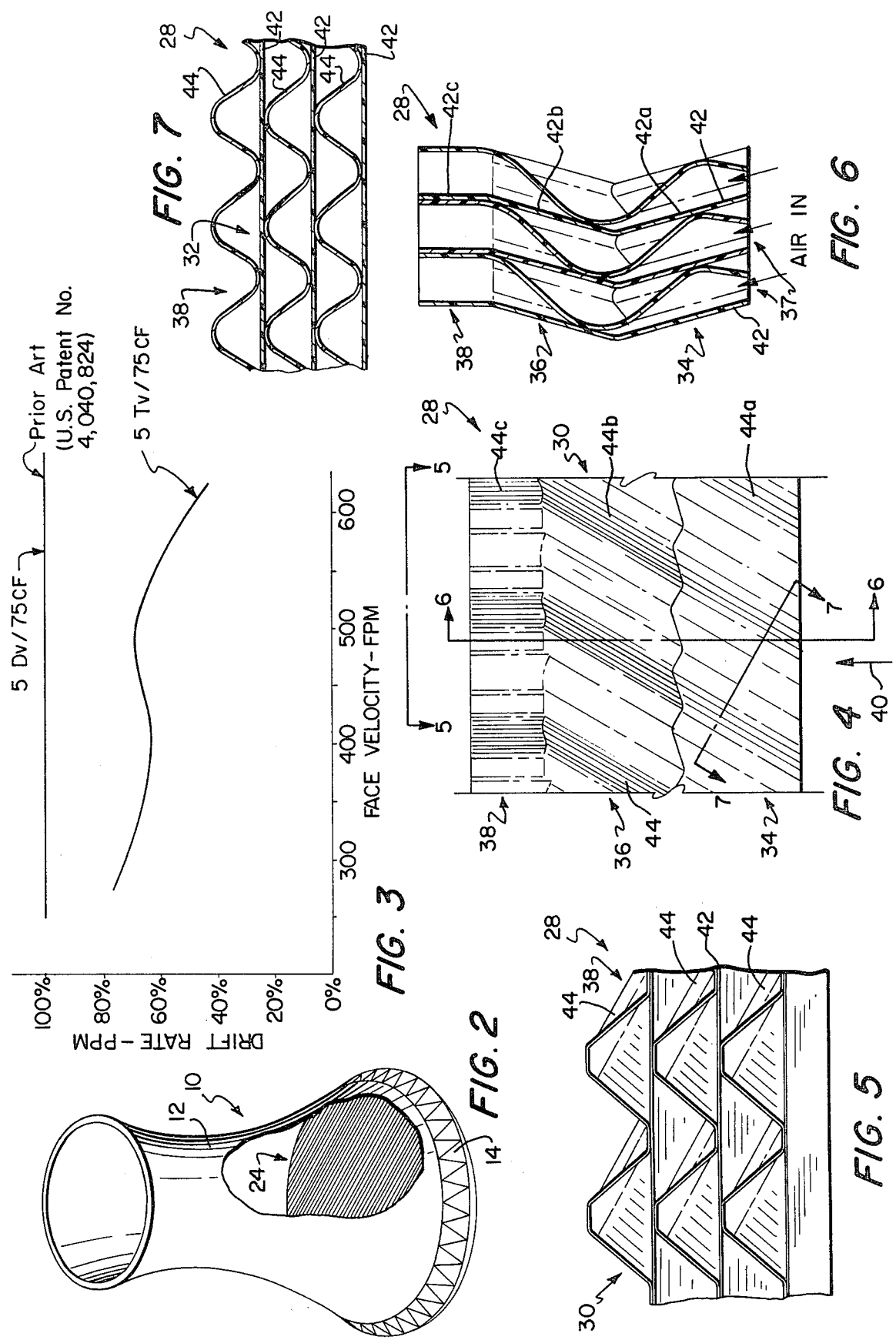

DRIFT ELIMINATOR STRUCTURE FOR COUNTERFLOW WATER COOLING TOWER

BACKGROUND OF THE INVENTION

1. Field of the Invention

The present invention is concerned with a greatly improved cellular drift eliminator especially designed for use in connection with counterflow water cooling towers wherein descending quantities of hot water are brought into intersecting, thermal interchange with upflowing currents of ambient-derived air. More particularly, it is concerned with such a drift eliminator which serves to remove a significant portion of entrained water particles in the air leaving the tower fill, while at the same time avoiding undue pressure drops. In addition, the eliminator hereof produces a size distribution in water particles leaving the tower which is desirable, i.e., a large proportion of entrained water particles leaving the tower are of relatively small size so that excessive wetting of equipment and structures closely adjacent the tower is avoided.

2. Description of the Prior Art

In evaporative water cooling towers of the counterflow variety heat is removed from initially hot water by causing the latter to gravitate through a surface-increasing fill assembly in counterflowing, intersecting relationship to currents of cool, ambient-directed air directed upwardly through the fill. Drift eliminators are normally provided to remove entrained droplets or particles of water from the air leaving the tower fill structure. If drift eliminators are not employed in such a context, substantial quantities of water can be discharged to the atmosphere. This results in undesirable operating conditions leading to excessive wetting of surrounding areas and corresponding coating thereof with mineral deposits. In addition, icing of adjacent equipment and structures can readily occur during wintertime operations. Thus, adequate drift elimination is very necessary with evaporative type cooling towers, especially when large towers are used in metropolitan areas or as a part of a large industrial complex where cold weather occurs.

Although it is desirable from a theoretical standpoint to remove essentially all water particles from cooling tower discharge air, as a practical matter this is an impossibility. Given this constraint, it is important that the particle size distribution of discharged water droplets be the most desirable from the standpoint of avoiding excessive wetting closely adjacent the tower. If, for example, the entrained water particles are relatively large and hence massive, they will tend to deposit on equipment or structures close to the tower. On the other hand, if the entrained particles are of relatively small size, there is a greater tendency for the water to spread and diffuse over a much larger area. In the latter case, undue icing or damage to adjacent equipment or the like is avoided. Therefore, it is important not only to remove as much water as possible on an absolute basis from fill-derived air, but also to ensure that the water which does escape to the atmosphere be predominantly of small particle size.

U.S. Pat. No. 4,040,824 describes a dual path drift eliminator structure which is particularly designed for crossflow cooling towers. The drift eliminator described in this patent includes side-by-side cellular drift eliminator sections separated by an elongated, upright channel or spacing which permits water to drain vertically from the eliminator.

While the two-pass eliminator of U.S. Pat. No. 4,040,824 represents a real advance in the art, particularly in connection with crossflow type cooling towers, attempted use thereof in conjunction with counterflow towers has led to problems. Specifically, the gap or discontinuity established between the cellular air paths tends to provide a region where water particles can coalesce and become reentrained in air passing through the eliminator. This not only lessens on an absolute basis the amount of water removed, but also tends to discharge to the air undesirable, relatively large water particles.

Accordingly, there is a need for an improved cellular-type drift eliminator especially designed for use in counterflow towers and which avoids the problems of excessive amounts of water being discharged from a counterflow tower, and particularly water in the form of large particles.

SUMMARY OF THE INVENTION

The drift eliminator of the present invention preferably includes structure having walls defining a plurality of elongated, discrete cells for passage of moisture laden air therethrough, with each of the cells presenting first, second and third elongated air diversion sections. Thus, a "three-path" eliminator is provided. In the eliminator, the longitudinal axes of the first and second sections are at an angle relative to one another, and similarly the longitudinal axes of the second and third sections are at an angle relative to one another. It is also significant that the walls defining the air diversion sections are joined to one another in end-to-end relationship such that the cells are free of any gaps or discontinuities along the length thereof.

In particularly preferred forms, the drift eliminator structure includes continuous, spaced, opposed, face-to-face wall members presenting first, second and third generally planar panels, with continuous, corrugated wall elements disposed between and secured to respective pairs of the wall members. In this fashion the eliminator can be formed in packs, and such packs can in turn be supported in a counterflow cooling tower for drift elimination purposes.

When oriented in such a counterflow tower, the longitudinal axes of the first, lowermost, air inlet air diversion sections are oriented at an angle relative to the intitial upward path of travel of the fill air. Similarly, the longitudinal axes of the intermediate, second sections are oriented at an angle relative to both the initial path of travel, and to the longitudinal axes of the first sections. Finally, the longitudinal axes of the third, uppermost, air exit sections are oriented in general alignment with the initial path of travel of the air, so that the air is discharged upwardly. In essence, the air passing through the eliminator follows a serpentine path and is ultimately discharged in an upright, generally vertical direction. During travel of the moisture-laden air through the eliminator, the entrained water particles impinge against the walls defining the air diversion sections in order that such water be removed from the air. By virtue of the fact that the cells are of continuous construction without any gaps or discontinuities along the length thereof, such water particles gravitate downwardly through the cells and ultimately drop off the air inlet face of the eliminator.

BRIEF DESCRIPTION OF THE DRAWINGS

FIG. 2 is a perspective view of a hyperbolic counterflow water cooling tower, with a section of the hyperbolic shell being broken away to illustrate the position of the drift eliminator of the present invention therein;

FIG. 3 is a graphical representation depicting the drift elimination characteristics of the three-path cellular eliminator in accordance with the present invention, as compared with a cellular eliminator of the type described in U.S. Pat. No. 4,040,824;

FIG. 4 is a fragmentary side view with parts broken away for clarity of an eliminator pack in accordance with the present invention;

FIG. 5 is a view taken along line 5—5 of FIG. 4 which illustrates the air exit face of the eliminator pack;

FIG. 6 is a vertical sectional view taken along line 6—6 of FIG. 4 which depicts the construction of the eliminator pack; and FIG. 7 is a view taken along line 7—7 of FIG. 4 which further illustrates the construction of the eliminator pack.

DESCRIPTION OF THE PREFERRED EMBODIMENT

Figure 1:
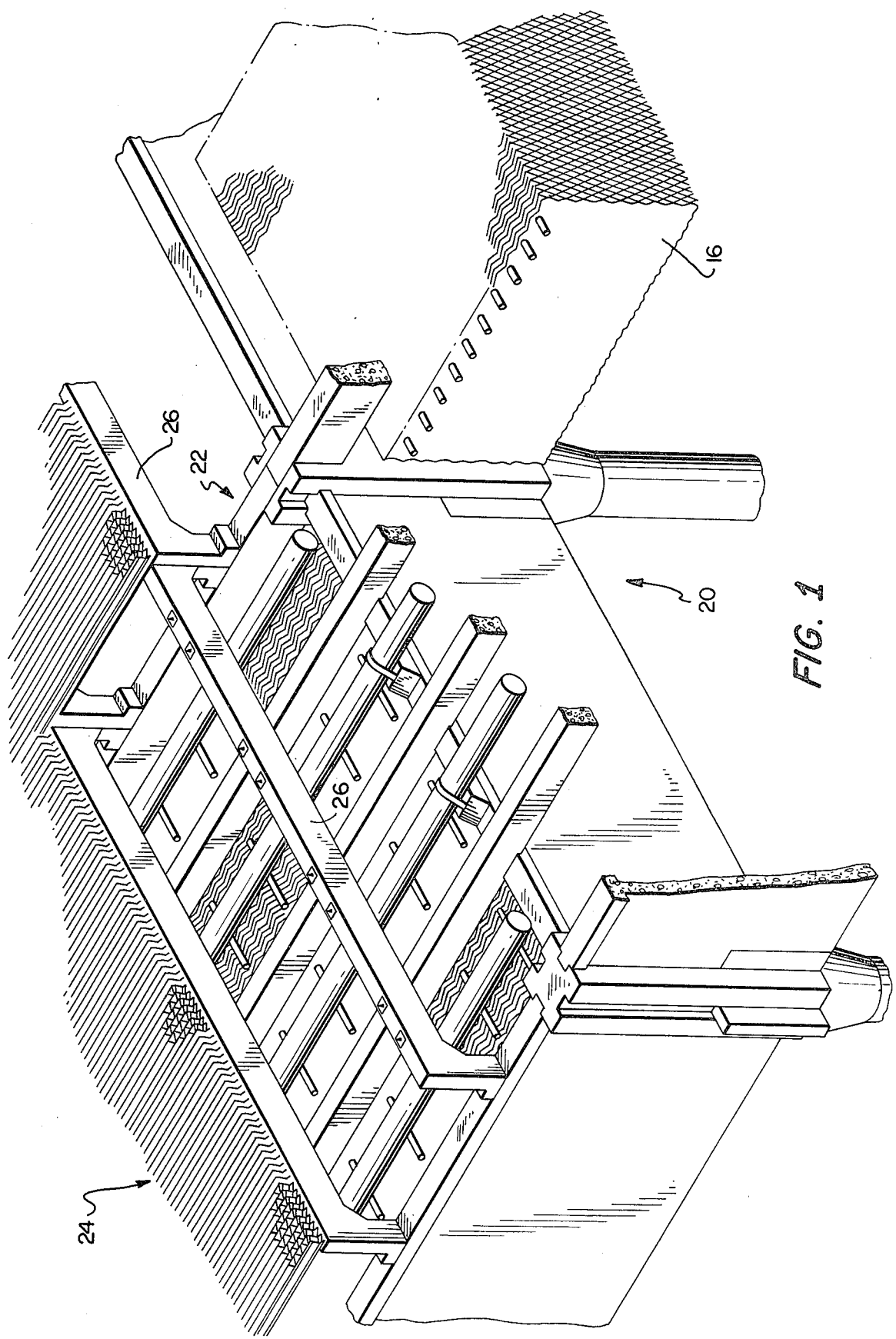
FIG. 1 is a fragmentary perspective view illustrating the internal construction of a hyperbolic, natural draft counterflow water cooling tower, and illustrates the orientation of the fill structure and water distribution assembly, with the drift eliminator of the present invention being operatively disposed above the water distribution assembly.

Turning now to the drawings, FIGS. 1 and 2 illustrate the use of a drift eliminator in accordance with the invention, in the context of a natural draft hyperbolic counterflow cooling tower 10. The tower 10 includes an upright hyperbolic concrete shell 12 for inducing ambient-derived air currents and pulling the same through lower air inlet openings 14. A multiple sheet synthetic resin fill assembly 16 (see FIG. 1) is disposed within shell 12 and is supported above the tower cold water collection basin (not shown) by means of support structure broadly referred to by the numeral 20. A hot water distribution assembly 22 is also supported by structure 20 above fill 16, and serves to distribute initially hot quantities of water over the fill for downward travel therethrough. At the same time, cool ambient air currents are drawn upwardly through the fill for thermal, counterflowing, intersecting relationship within the fill.

A drift eliminator 24 is mounted above the fill 16 and distribution assembly 22 on respective elongated supports 26. As best seen in FIG. 2, the eliminator extends over the entirety of the fill, such that essentially all air passing upwardly through the tower passes through the eliminator. Broadly speaking, the purpose of eliminator 24 is to remove entrained water particles from the air leaving fill assembly 16, and to ensure that the water which escapes removal and is discharged from tower 10 has a desirable size distribution.

Turning now to FIGS. 4–7, the construction of the preferred eliminator in accordance with the invention will be described. In particular, a portion of an eliminator pack 28 is illustrated for purposes of example, and it will be understood that the overall eliminator 24 is formed of a plurality of side-by-side packs.

In more detail, the pack 28 includes walls 30 which define a plurality of elongated, continuous, discrete cells 32 for passage of moisture laden air therethrough. Each of the cells 32 presents first, second and third elonated air diversion sections along the length thereof which are defined by corresponding wall sections 34, 36 and 38. The first, lowermost sections define the air entrance for the pack 28, whereas the third sections serve as the air outlet.

A study of FIGS. 4–7 will confirm that the respective air diversion sections are oriented such that the longitudinal axes of the first and second sections are at an angle relative to one another and are disposed in a first obliquely oriented plane. On the other hand, the longitudinal axes of the second and third sections are at an angle relative to one another, with the longitudinal axes of the third sections being disposed in a second plane oriented at an angle relative to the first plane. In the use of the pack 28 in a counterflow tower, the pack is mounted as best seen in FIG. 4, with the longitudinal axes of the third sections of the cells being in an upright orientation and in general alignment with the direction of travel of the incoming air, illustrated by arrow 40.

Another feature of the eliminator of the present invention is that the respective cells 32 are free of discontinuities or gaps along the length thereof, i.e., the wall sections 34, 36 and 38 are joined to one another in an end-to-end relationship. It has been found that this gap-free construction is important in order to achieve enhanced drift elimination.

Although the cells 32 can be defined by corresponding walls of various configurations, it has been found that from the standpoint of cost and ease of fabrication that the eliminator should preferably include continuous, spaced apart, opposed face-to-face wall members 42 presenting first, second and third generally planar panels corresponding to the first, second and third air diversion sections. Continuous, corrugated wall elements 44 are disposed between and adhesively secured to respective pairs of the wall members 42. The corrugated elements 44 are configured to abut and conform to the wall members 42, as will be seen from the drawings. In practice, the wall members 42 and elements 44 are formed from a synthetic resin material such as polyvinyl chloride using standard vacuum forming techniques.

Referring to FIG. 6, it will be seen that each of the wall members 42 includes first and second panels 42a and 42b which cooperatively present, in cross section, a substantially V-shaped body, with a planar panel 42c secured to and extending from the end of panel 42b remote from panel 42a. By the same token, the corrugated wall elements 44 include first and second portions 44a and 44b which, in cross section, are somewhat V-shaped, with a planar portion 44c designed to fit between and engage the panels 42c of respective pairs of the wall members 42. It will thus be appreciated that the alternating wall members 42 and wall elements 44 cooperatively define therebetween the continuous, elongated, gap-free cells 32.

In the use of a drift eliminator in accordance with the invention in the context of a counterflow water cooling tower, moisture laden air from the fill assembly 16 passes upwardly as illustrated by arrow 40 of FIG. 4 into and serially through the first, second and third elongated, continuous, interconnected, generally upwardly extending air paths defined by the wall sections 34, 36 and 38. During such travel, the moisture-laden air travels a somewhat serpentine path and is ultimately discharged upwardly in general alignment with the path of travel of the entering air. During the diversion of the air as it passes through the eliminator, the entrained water particles impinge against the walls defining the continuous cells 32, with the result that such water is removed from the air leaving the eliminator. Such removed water flows under the influence of gravity downwardly through the cells 32 and drains from the eliminator only at the moist air entrance face 37 thereof. As noted above, this has been found important not only from the standpoint of elimination of a large portion of the entrained water particles, but also in order to assure that a preponderance of the water particles actually discharged from the tower 10 are relatively small.

FIG. 3 is a graphical representation illustrating the results of a comparative test wherein a drift eliminator in accordance with the present invention (denominated "5Tv/75cf") was compared with the drift eliminator of the type described in U.S. Pat. No. 4,040,824 (denominated "5Dv/75cf"). In the test, both types of eliminators were placed in a counterflow cooling tower and tested under the same operative conditions. All variables were the same, except that the height of the "5Tv/75cf" eliminator was slightly greater (¾ inch) than the "5Dv/75cf" unit; this difference was insignificant to the results of the test. The average face velocity in lineal feet per minute was measured in each case, along with the drift rate in parts per million of water entrained in the exiting air. For purposes of ease of comparison, the results obtained with the prior art eliminator are listed as "100%" drift, whereas the results obtained using the eliminator of the present invention are comparatively graphed. As is apparent from a study of the FIG. 3 graph, the drift elimination achieved with the unit in accordance with the present invention was significantly greater than that obtained using the prior unit. In general, as face velocities increased, the differences in drift elimination also increased. It is also significant that there was no measurable difference in the pressure drops recorded in connection with the comparative drift eliminators. Hence, the eliminator of the invention gave enhanced results without significant increases in pressure drop.

Additional test results also confirm that the size distribution of entrained water particles in air leaving the eliminator of the invention is desirable, i.e., a large percentage of the particles are of relatively small size with a comparatively small number of undesirable large, massive water particles.

We claim:

1. A drift eliminator, comprising:
   structure including walls defining a plurality of elongated, discrete cells for passage of moisture-laden air therethrough,
   each of said cells presenting first, second and third elongated air diversion sections therealong defined by corresponding wall sections,
   the longitudinal axes of said first and second sections being at an angle relative to one another,
   the longitudinal axes of said second and third sections being at an angle relative to one another,
   the longitudinal axes of said first and second sections being disposed in a first plane,
   the longitudinal axis of said third section being disposed at an angle relative to said first plane,
   said wall sections being joined to one another in end-to-end relationship such that said cells are free of discontinuities along the length thereof,
   said structure including continuous, spaced, opposed, face-to-face wall members presenting first, second and third generally planar regions corresponding to said diversion sections with continuous, individually corrugated wall elements separate from said wall members and disposed between and secured to the adjacent faces of respective pairs of said wall members.

2. The drift eliminator as set forth in claim 1, said first and second regions being oriented at an angle to one another to cooperatively present a V-shaped body.

3. The drift eliminator as set forth in claim 1, said first section comprising the air inlet section for said eliminator, and said third section comprising the air outlet for said eliminator, the longitudinal axis of said third section being in an upright orientation.

4. In a counterflow cooling tower having means for distributing initially hot water, a fill assembly located beneath said distribution means for dispersing hot water gravitating from the latter, means for directing ambient-derived air currents through said fill assembly in counterflow intersecting relationship to the descending flow of water therethrough for cooling of the latter and for thereafter directing said air currents upwardly from said fill assembly, the improvement which comprises a drift eliminator positioned above said hot water distribution means for removing droplets of water entrained in moist air leaving the fill assembly, said drift eliminator including:
   structure including walls defining a plurality of elongated, generally upright, discrete cells for passage of said moist air therethrough,
   each of said cells presenting first, second, and third elongated air diversion sections therealong defined by corresponding wall sections,
   the longitudinal axes of said first and second sections being at an angle relative to one another,
   the longitudinal axes of said second and third sections being at an angle relative to one another,
   the longitudinal axes of said first and second sections being disposed in a first plane,
   the longitudinal axis of said third section being disposed at an angle relative to said first plane,
   said wall sections being joined to one another in end-to-end relationship such that said cells are free of discontinuities along the length thereof,
   said structure including continuous, spaced, opposed, face-to-face wall members presenting first, second and third generally planar regions corresponding to said diversion sections, with continuous, individually corrugated wall elements separate from said wall members and disposed between and secured to the adjacent faces of respective pairs of said wall members; and
   means mounting said drift eliminators above said hot water distribution means with the longitudinal axis of said first diversion section oriented at an angle relative to said upwardly directed air currents from said fill assembly.

5. The tower as set forth in claim 4, said air directing means comprising a hyperbolic, natural draft-inducing stack.

6. The tower as set forth in claim 4, said first and second regions being oriented at an angle to one another to cooperatively present a V-shaped body.

7. The tower as set forth in claim 4, said first section comprising the air inlet section for receiving said moist air from said fill assembly, said third section comprising the air outlet for said drift eliminator, and said means mounting said drift eliminator positioning said third section such that the longitudinal axis of said third section is in an upright orientation.

* * * * *